US012636877B2

(12) United States Patent
Thebud et al.

(10) Patent No.: US 12,636,877 B2
(45) Date of Patent: May 26, 2026

(54) ADHESIVE PRINTING FORM ATTACHMENT LAYER, METHOD FOR ITS MANUFACTURE, AND PRINTING FORM ATTACHMENT CYLINDER COMPRISING THE SAME

(71) Applicant: tesa SE, Norderstedt (DE)

(72) Inventors: Nils Thebud, Lüneburg (DE); Tobias Winkler, Hamburg (DE); Björn Zeysing, Hamburg (DE)

(73) Assignee: tesa SE, Norderstedt (DE)

( * ) Notice: Subject to any disclaimer, the term of this patent is extended or adjusted under 35 U.S.C. 154(b) by 323 days.

(21) Appl. No.: 17/144,660

(22) Filed: Jan. 8, 2021

(65) Prior Publication Data

US 2021/0214584 A1    Jul. 15, 2021

(30) Foreign Application Priority Data

Jan. 9, 2020    (EP) .................................... 20150835

(51) Int. Cl.
| | |
|---|---|
| *B41F 5/24* | (2006.01) |
| *B41F 13/08* | (2006.01) |
| *C08K 3/011* | (2018.01) |
| *C08K 3/34* | (2006.01) |
| *C08K 5/00* | (2006.01) |
| *C08K 5/10* | (2006.01) |
| *C08K 5/29* | (2006.01) |
| *C09J 7/24* | (2018.01) |
| *C09J 7/25* | (2018.01) |
| *C09J 7/26* | (2018.01) |
| *C09J 7/29* | (2018.01) |
| *C09J 183/04* | (2006.01) |

(52) U.S. Cl.
CPC ................ *B41F 5/24* (2013.01); *B41F 13/08* (2013.01); *C08K 3/011* (2018.01); *C08K 3/34* (2013.01); *C08K 5/0025* (2013.01); *C08K 5/10* (2013.01); *C08K 5/29* (2013.01); *C09J 7/24* (2018.01); *C09J 7/243* (2018.01); *C09J 7/245* (2018.01); *C09J 7/25* (2018.01); *C09J 7/255* (2018.01); *C09J 7/26* (2018.01); *C09J 7/29* (2018.01); *C09J 183/04* (2013.01); *C08L 2205/02* (2013.01); *C09J 2301/122* (2020.08); *C09J 2301/408* (2020.08); *C09J 2400/243* (2013.01); *C09J 2409/00* (2013.01); *C09J 2423/00* (2013.01); *C09J 2423/046* (2013.01); *C09J 2423/106* (2013.01); *C09J 2427/006* (2013.01); *C09J 2433/00* (2013.01); *C09J 2463/00* (2013.01); *C09J 2467/00* (2013.01); *C09J 2467/006* (2013.01); *C09J 2469/00* (2013.01); *C09J 2471/00* (2013.01); *C09J 2475/00* (2013.01); *C09J 2477/00* (2013.01); *C09J 2477/006* (2013.01); *C09J 2483/00* (2013.01)

(58) Field of Classification Search
None
See application file for complete search history.

(56) References Cited

U.S. PATENT DOCUMENTS

| | | | |
|---|---|---|---|
| 3,983,298 A | 9/1976 | Hahn et al. | |
| 6,079,329 A | 6/2000 | Goovaard et al. | |
| 6,558,790 B1 * | 5/2003 | Holguin ..................... | C09J 4/00 |
| | | | 428/317.1 |
| 8,147,974 B2 * | 4/2012 | Baikerikar ........... | C09D 201/02 |
| | | | 428/428 |
| 8,981,008 B2 * | 3/2015 | Moctezuma Espiricueto et al. .... | |
| | | | C08L 95/00 |
| | | | 525/940 |
| 11,414,525 B2 * | 8/2022 | Hartmann-Thompson .................. | |
| | | | C08G 77/24 |
| 2010/0199871 A1 | 8/2010 | Vest et al. | |
| 2022/0002595 A1 * | 1/2022 | Otake ..................... | C08G 77/20 |

FOREIGN PATENT DOCUMENTS

| | | | | |
|---|---|---|---|---|
| EP | 0355991 A2 | 2/1990 | | |
| EP | 835918 A2 * | 4/1998 | ............ | C08F 299/08 |
| EP | 1800865 A2 | 6/2007 | | |
| EP | 2225339 B1 | 6/2016 | | |
| EP | 3885420 A1 | 9/2021 | | |
| JP | 63130392 | 6/1988 | | |
| JP | 10171105 | 6/1998 | | |
| WO | 9519267 A1 | 7/1995 | | |
| WO | WO-2006033147 A1 * | 3/2006 | ............ | C08F 283/12 |
| WO | WO-2010056544 A1 * | 5/2010 | ............ | A61L 15/58 |
| WO | 2010090685 A1 | 8/2010 | | |

(Continued)

OTHER PUBLICATIONS

Machine translation of WO 2020105365-A1 (Year: 2020).*

(Continued)

*Primary Examiner* — Frank D Ducheneaux

(74) *Attorney, Agent, or Firm* — Price Heneveld LLP

(57) ABSTRACT

The present disclosure relates to an adhesive printing form attachment layer comprising a support, and a permanently sticky layer suitable for receiving a printing form and fixing a printing form during a printing operation provided on the support, wherein the permanently sticky layer comprises a crosslinked silicone-based material. The present disclosure further relates to a method for preparing an adhesive printing form attachment layer, as well as a printing cylinder comprising it, the use of the an adhesive printing form attachment layer for fixing a flexographic printing plate during a printing operation on a printing cylinder, and a method of operating a printing machine wherein the adhesive printing form attachment layer is used.

23 Claims, No Drawings

(56)　　　　　　References Cited

FOREIGN PATENT DOCUMENTS

WO　　WO-2016100021 A1 *　6/2016　............. A61L 15/58
WO　　WO-2020105365 A1 *　5/2020　........... C08F 290/06

OTHER PUBLICATIONS

Lewis, Larry N. et al., "Platinum Catalysts Used in the Silicones Industry: Their Synthesis and Activity in Hydrosilylation," Platinum Metals Rev., 1997, 66-75, 41:2.
European Patent Office, European Search Report and European Search Opinion, European Patent Application No. 20150835.5, Jul. 8, 2020, 9 pages.
Office Action issued in European Patent Application EP 20150835.5 dated Jul. 11, 2023, 5 pages.

* cited by examiner

ADHESIVE PRINTING FORM ATTACHMENT LAYER, METHOD FOR ITS MANUFACTURE, AND PRINTING FORM ATTACHMENT CYLINDER COMPRISING THE SAME

CROSS-REFERENCE TO RELATED APPLICATION

This application claims the benefit of priority under 35 U.S.C. § 119 of European Patent Application No. 20150835.5, filed 9 Jan. 2020, the contents of which are relied upon and incorporated herein by reference in their entirety.

BACKGROUND OF THE DISCLOSURE

Field of the Disclosure

The present disclosure relates to an adhesive printing form attachment layer that is used on a printing cylinder in a flexographic printing process for adhesively fixing the printing form (i.e., the printing plate) to the cylinder during the printing process, and to a manufacturing process for the adhesive printing form attachment layer. The present invention further relates to a printing cylinder or a set of printing cylinders each being equipped with the adhesive printing form attachment layer, and to the use of the adhesive printing form attachment layer in a flexographic printing process.

Background Art

There are several known methods of attaching a printing plate to a printing cylinder. The most widely used method is the use of double stick tape (a tape that is provided on both sides with a pressure-sensitive adhesive). A second method involves the use of an adhesive printing form attachment layer that includes an adhesive photopolymer to adhere the printing plate to the printing cylinder. This method is described for instance in WO 95/19267.

The use of a double stick tape is problematic in that there may occur difficulties in removing the tape from the printing cylinder and/or from the printing plate. Also, the double stick tape frequently leaves residues behind which will later interfere with the reuse of the printing plate or will deteriorate the printing performance in subsequent printing operations. Attaching the double stick tape uniformly and without causing surface irregularities that impair the printed image is also a cumbersome manual operation. In addition, the use of multiple pieces of double stick tape, as is generally required, makes alignment of the printing plate on the printing cylinder difficult, especially since removal and repositioning is difficult.

WO 95/19267 describes the use of an adhesive printing form attachment layer to replace the double stick tapes. The general term "adhesive" is used here in the meaning of "permanent tacky" or "permanent sticky", and the same meaning is encompassed by this term in the present disclosure. There is however no specific teaching on the chemistry and the method for manufacturing the adhesive printing form attachment layer, other than that it is photopolymeric.

WO 2010/090685 A1 describes a means for removably attaching a printing plate to a printing cylinder using an intermediate sheet of photopolymer. The stickiness of the photopolymer is used to attach itself to the printing cylinder and to attach the printing plate to it. Microspheres are incorporated into the photopolymer sheet to provide a cushioning effect when in use on the printing press.

The photopolymer layer referred to in that document is prepared by mixing the components of the photopolymer, i.e., binder, monomer, photoinitiator and microspheres, and curing the composition after it is cast or extruded into a sheet, followed by irradiation with UV. The document states that the amount of radiation necessary varies based upon the composition and thickness of the photopolymer, and that the amount of radiation used, and therefore the extent of curing, can be used to control the stickiness of the photopolymer. However, the curing must be sufficient to achieve sufficient integrity and strength. This is in particular required because the photopolymer layer of that document does not contain a substrate on which the photopolymeric layer is provided; instead the extruded photopolymeric layer is attached directly to the printing cylinder.

With a layer of that kind, due to the adhesive attachment of the photopolymer sheet to both the printing cylinder and the printing form (printing plate) on opposing sides of the photopolymer sheet, the layer may come off the printing cylinder when the printing form is removed, as the adhesion may be equally strong on both sides. Also, damages to the surface carrying the printing form will likely occur upon removal or replacement of the printing form in case the adhesion is strong, thereby reducing the lifetime of the adhesive printing form attachment layer. Further, if the adhesion is not strong enough, the printing form may come off the printing cylinder during operation. In addition, the presence of microspheres may deteriorate the adhesive properties of the layer and may lead to irregularities on the surface, which will transpose through the printing form, thereby potentially reducing print quality and/or causing offset.

As outlined above, conventional means for attaching a printing form to a printing cylinder, such as by using a double-sided adhesive tape, suffer from various drawbacks. Also, the use of a photopolymeric layer, as far as disclosed in the prior art, generally makes use of materials that are designed to have the necessary adhesive properties, but that are not designed to additionally provide benefits going beyond mere adhesiveness or stickiness per se.

A further disadvantage of prior art material is that they are typically hydrocarbon-based, which contributes to their environmental load in terms of production and disposal, such as generation of carbon dioxide. Also, such materials are generally flammable. A good compatibility with an oily printing ink may also lead to a permanent staining or incorporation of ink into the upper adhesive (or permanently sticky) layer, leading to aesthetic and potentially functional impairments.

BRIEF SUMMARY OF THE DISCLOSURE

The present disclosure aims at providing a novel adhesive printing form attachment layer that is able to provide for the reliable adhesive attachment of a printing form during a printing process to a printing cylinder, as well as a method for its manufacture. The adhesive printing form attachment layer is aimed at overcoming one or more drawbacks of prior art adhesive printing form attachment layers, and is in particular characterized by achieving improvements in one or more of the following aspects as compared to prior art adhesive printing form attachment layers:

High adhesion (stickiness) and simultaneously high integrity and strength;

Improved durability and lifetime;

Improved printing quality over a large number of prints with one printing form and/or after re-use with a large number of printing forms;

Easy removal of residues of printing ink and/or parts of the printing form;

The ability of a sufficiently strong attachment to the printing cylinder;

The ability to provide for quasi-elastic properties;

A reduced environmental load and/or flammability; and

Easy adjustment of desired layer thickness.

Other and further advantages of the present invention will become more apparent in view of the following description.

The present inventors have found that one or more of the problems underlying the present disclosure can be solved by improving the composition and structure of the adhesive printing form attachment layer ("APFAL"), in particular by improving the composition of the permanently sticky (or adhesive) layer that serves to receive and fix the printing form (i.e., printing plate), and providing it on a support. Unless otherwise defined, the terms "support" and "substrate" are used as synonyms.

The connection of the APFAL to the printing cylinder is via a substrate layer on which the permanently sticky layer ("PSL") is provided. This allows obtaining sufficiently high stickiness on the side that serves to attach the printing form and also allows obtaining high strength and integrity throughout the PSL, while also ensuring a secure connection to the substrate.

The present disclosure provides the following aspects:

1. Adhesive printing form attachment layer comprising a support, and a permanently sticky layer suitable for receiving a printing form and fixing a printing form during a printing operation provided on the support, wherein the permanently sticky layer comprises a crosslinked silicone-based material (A).

2. Adhesive printing form attachment layer according to aspect 1, wherein the crosslinked silicone-based material (A) includes a material that is formed by crosslinking a crosslinkable composition comprising a crosslinkable silicone-based material, and the crosslinkable silicone-based material includes a compound (a1) having a composition represented by formula (1):

$$(R_3SiO_{1/2})_n(R_2SiO)_m(RSiO_{3/2})_o(SiO_2)_p \quad (1)$$

wherein the R groups are the same or different in each instance, provided that at least two R groups are a group $R^a$ that includes a crosslinkable group, preferably an ethylenically unsaturated group, and the remaining R groups are selected from the group consisting of substituted or unsubstituted alkyl groups, substituted or unsubstituted aryl groups, and substituted or unsubstituted polydiorganosiloxy groups, n and m each is >0, o and p each is 0.

3. Adhesive printing form attachment layer according to aspect 1 or 2, wherein the silicone-based material (A) includes a material that is formed by crosslinking a crosslinkable composition comprising a crosslinkable silicone-based material, and the crosslinkable silicon-based material includes a linear crosslinkable silicone (a2) represented by formula (2):

$$R^1_3Si{-}O{-}(SiR^2_2{-}O)_q{-}SiR^1_3 \quad (2)$$

wherein q is an integer of 50 or greater, preferably 100 to 6000, the groups $R^1$ and $R^2$ can be the same or different and each represent a substituted or unsubstituted alkyl group or a substituted or unsubstituted aryl group, provided that at least two of the groups represented by $R^1$ and $R^2$ are a group $R^a$ containing a crosslinkable group, which is preferably an ethylenically unsaturated group.

4. Adhesive printing form attachment layer according to aspect 2 or 3, wherein the group $R^a$ that contains a crosslinkable group is represented by formula (3):

$$CH_2{=}CH(X){-}C(O)O{-}L \quad (3)$$

wherein X is hydrogen or a methyl group, and L is a divalent connecting group binding the group of formula (3) to the remainder of the compound of formula (1) or (2), respectively.

5. Adhesive printing form attachment layer according to any one of aspects 2 to 4, wherein the crosslinkable composition comprises, in addition to the compound (a1) and/or (a2), a crosslinking compound (a3) comprising at least two groups having reactivity with the crosslinkable group comprised in the at least two groups $R^a$ present in the compound (a1) and/or (a2), wherein the groups having reactivity with the crosslinkable group comprised in the group $R^a$ preferably are silicon hydride (Si—H) groups.

6. Adhesive printing form attachment layer according to any one of aspects 2 to 5, wherein the crosslinkable silicone-based material comprises, in addition to the compound (a1) and/or (a2) and/or (a3), a crosslinking initiator that is able to initiate a crosslinking reaction upon heating or irradiation, preferably in the UV range, and/or a crosslinking catalyst, preferably including Pt.

7. Adhesive printing form attachment layer according to any one of aspects 1 to 6, wherein the permanently sticky layer further comprises a polymeric material (B) in addition to the crosslinked silicone-based material (A), which material (B) is preferably selected from the group of (meth) acrylate polymers and copolymers, polyurethanes, alpha-olefins and copolymers thereof, homopolymers and copolymers of diener, epoxy resins, polyamides, polycarbonates, polyesters, polyethers and silicone resins.

8. Adhesive printing form attachment layer according to any one of aspects 1 to 6, wherein the permanently sticky layer has a total content of cyclic siloxanes of 1000 ppm by weight or less, relative to the total weight of the permanently sticky layer.

9. Adhesive printing form attachment layer according to any one of aspects 1 to 7, wherein the permanently sticky layer has a total content of cyclic siloxanes selected from d4, d5 and d6 siloxanes of 500 ppm by weight or less, relative to the total weight of the permanently sticky layer.

10. Adhesive printing form attachment layer according to any one of aspects 1 to 9, wherein the permanently sticky layer is obtained after conducting a crosslinking reaction of a crosslinkable silicone-based material, and wherein the degree of shrinking, expressed by the volume of the layer after crosslinking relative to the volume of the layer before crosslinking, is 3% or less.

11. Adhesive printing form attachment layer according to any one of aspects 1 to 10, wherein the support is a polymer film, such as a film of polyethylene terephthalate ("PET"), polyvinyl chloride ("PVC"), polyethylene ("PE"), polyamide ("PA"), or polypropylene ("PP").

12. A method for preparing an adhesive printing form attachment layer as defined in any one of aspects 1 to 11, wherein the method comprises the steps of (i) Providing a composition comprising a crosslinkable silicone-based compound on a support, and (ii) Crosslinking the composition provided in step (i) on the support by applying heat or radiation, preferably in the UV range.

13. Printing form attachment layer obtainable by the method according to aspect 12.

14. Printing cylinder comprising a printing form attachment layer according to any one of aspects 1 to 11 and 13; or set of printing cylinders each comprising a printing form attachment layer according to any one of aspects 1 to 11 and 13.

15. Method of use of a printing form attachment layer according to any one of aspects 1 to 11 or 13, wherein the method comprises the step of fixing a flexographic printing plate during a printing operation on a printing cylinder.

16. Method of operating a printing machine, the method comprising

Providing a printing from attachment layer according to any one of aspects 1 to 11 and 13 on a printing cylinder, the permanently sticky layer being provided radially outwards;

Conducting printing using the printing form attached to the printing form attachment layer;

Replacing the used printing form by a new printing form and conducting printing with the new printing form, once or several times;

Cleaning the permanently sticky layer using a solvent; and

Attaching a printing form to the printing cylinder via the cleaned permanently sticky layer, and conducting printing.

DETAILED DESCRIPTION OF THE DISCLOSURE

In the present invention, all parameters and product properties relate to those measured under standard conditions (25° C., 105 Pa) unless stated otherwise.

All physical parameters can be determined by standard methods in the art and/or the following detailed description. In case of discrepancy between a standard method and a method described below, the present description prevails.

Whenever a range is expressed as "from x to y", or the synonymous expression "x-y", the end points of the range (i.e., the value x and the value y) are included. The range is thus synonymous with the expression "x or higher, but y or lower".

As used herein, the indefinite article "a" indicates one as well as more than one and does not necessarily limit its reference noun to the singular.

The term "about" means that the amount or value in question may be the specific value designated or some other value in its neighborhood, generally within a range of ±5% of the indicated value. As such, for instance the phrase "about 100" denotes a range of 100±5.

The term "and/or" means that either all or only one of the elements indicated is present. For instance, "a and/or b" denotes "only a", or "only b", or "a and b together". In the case of "only a" the term also covers the possibility that b is absent, i.e., "only a, but not b".

The term "translucent" denotes that a material is able to transmit electromagnetic radiation in the range of 250 to 700 nm. The luminous transmittance of a translucent material is typically 50% or higher, such as 70% or higher or 80% or higher, at all wavelengths falling within the range from 250 to 700 nm, determined on a sample of a material having a thickness of 1 mm according to ASTM D1003-07 (Procedure A). "Translucent" materials also include transparent materials.

The term "crosslinkable" denotes that a composition or compound is able to undergo a crosslinking reaction upon proper initiation, such as by irradiation with electromagnetic radiation, electron beams or heat, preferably only upon irradiation with electromagnetic radiation having a wavelength of 350 nm or shorter, in the following also referred to as UV. The term "crosslinked" denotes the material that is obtained after the crosslinkable composition or compound has undergone a crosslinking reaction. In the terms of the present disclosure, the terms "crosslinking" and "crosslinked" do not include (the formation of) a siloxane bond as being defined as a Si—O—Si linkage, as is, e.g., observed upon condensation of alkoxysilanes.

In the present disclosure, whenever reference is made to the molecular weight of a polymeric compound, it is generally the weight-average molecular weight unless indicated differently, and the molecular weight is determined by a GPC method using a polystyrene standard. The term "number average molecular weight" refers to a value obtained by a GPC method using a polystyrene standard.

The term "layer" denotes a material having a physical shape in which the extension in each of two directions that are orthogonal to each other (x,y) exceeds that in a third direction (z) that is orthogonal to each of the directions x any y by a factor of 10 or more, such as 100 or more, 500 or more or 1000 or more. The direction "z" may also be referred to as the thickness of the layer. The term "layer" also includes a sheet as a specific form of a layer.

The term "adhesive" denotes the ability of a material to provide a releasable connection to another material by adhesive force. In the present disclosure, the adverb "adhesive" and the adjective "adhesively", respectively, as used, e.g., for the description of the adhesive printing form attachment layer or how a printing form is held on an adhesive printing form attachment layer during a printing operation, include the meanings "sticky" and "permanently sticky", as well as "tacky" or "permanently tacky". These terms may thus be considered equivalent to "adhesive".

The term "(meth)acrylic monomer" denotes esters of acrylic acid and methacrylic acid, such as alkyl esters wherein the alkyl group has 1 to 18 carbon atoms, as well as methacrylic acid and acrylic acid.

In the sense of the present invention, a printing form attachment layer ("APFAL") is a structure that is able to provide a support for a printing form (i.e., printing plate), in particular a flexographic printing plate, during a printing process when mounted on a printing cylinder (printing sleeve). The APFAL layer has a permanently sticky layer ("PSL") comprising a crosslinked silicone-based material. The PSL is able to fix the printing plate by adhesive force due to its inherent stickiness. In embodiments, the PSL has a surface stickiness of at least 400 gram as measured by ASTM standard D-2979-95. The APFAL also comprises a substrate, which is typically also in the form of a layer. During use, the substrate is oriented towards the printing cylinder (printing sleeve), and it may be provided on the printing cylinder (sleeve) directly or via an intermediate layer, such as a cushioning layer, but typically without an intermediate or cushioning layer.

The PSL is typically provided such that the main contact area of the PSL is in direct contact with the substrate. Here, a "main contact area in which the PSL is in direct contact with the substrate" means that 90% or more, such as 100%, of one surface of the PSL, i.e., the plane in x-y-direction, is in direct contact with the substrate layer.

The present inventors have duly studied the characteristics necessary for an APFAL, and have completed the present disclosure based on the findings that a) providing the PSL on a support provides for a greater freedom in the composition of the PSL and in its properties, and b) a PSL based on a crosslinked structure obtainable by crosslinking a crosslinkable composition comprising at least one silicon-based crosslinkable compound that has two or more crosslinkable groups, which are preferably ethylenically unsaturated groups, allows obtaining an APFAL having the required balance of properties, including high adhesion/stickiness of the PSL, good cohesion of the PSL, structural integrity of the PSL and the APFAL, easy attachment and removal of the APFAL to and from a printing cylinder (also known as printing sleeve), and at the same time easy removal of stains and restoration of high stickiness by a simple cleaning operation using a solvent.

The APFAL of the present invention comprises at least the PSL and the substrate, and may consist of these two layers. Optionally, a cushioning layer may be provided on the substrate surface opposite the PSL. Each of these components will be described in more detail below.

Permanently Sticky Layer (PSL)

The PSL is suitable for receiving a printing form and fixing a printing form during a printing operation, and is provided on the support. The PSL comprises a crosslinked silicone-based material (A) that is obtained by crosslinking a crosslinkable silicone-based material. The crosslinkable silicone-based material is crosslinkable with itself or with one or more other components, and is part of a crosslinkable composition (CC) prior to the crosslinking reaction.

By providing a PSL with this structure, it becomes possible to realize the required balance of properties. This includes that prior to the crosslinking the composition is typically a fluid that can easily be provided on a substrate, and by effecting the crosslinking reaction, the material takes a semi-solid or solid form that has the required stickiness and also elasticity to withstand use conditions.

Crosslinkable Composition (CC) Comprising a Crosslinkable Silicone-Based Material The crosslinkable composition comprises at least one crosslinkable silicone-based material. Herein, the term "crosslinkable" means that the crosslinkable silicone-based material comprises two or more crosslinkable groups $R^a$ that are bound to a silicon atom or another atom of the crosslinkable silicon-based material (or compound). Noteworthy, a group of the general formula Si—OR' is not encompassed by the term "crosslinkable group $R^a$", even if herein R' should contain such a crosslinkable group as described herein below. This is due to the fact that such groups may undergo a condensation reaction forming a siloxane (Si—O—Si) bridge, which is no crosslink in the sense of the present invention. Put differently, the crosslink is a chemical bond or a chemical binding group that does not include a Si—O—Si linkage, and the crosslinking can include the formation of bonds other than an O—Si bond, such as the formation of a Si—C bond, a C—C bond or an O—C bond.

In one embodiment, the crosslinkable silicone-based material may be (a1) a compound of formula (1):

$$(R_3SiO_{1/2})_n(R_2SiO)_m(RSiO_{3/2})_o(SiO_2)_p \qquad (1)$$

wherein the R groups are the same or different in each instance, provided that at least two R groups are a group Rd that includes a crosslinkable group, preferably an ethylenically unsaturated group, and the remaining R groups are selected from the group consisting of substituted or unsubstituted alkyl groups, substituted or unsubstituted aryl groups, and substituted or unsubstituted polydiorganosiloxy groups, n and m each is >0, o and p each is 0. In the substituted or unsubstituted alkyl groups and the substituted or unsubstituted aryl groups, the number of carbon atoms is typically 24 or less, such as 20 or less or 15 or less, such as 10 or less or 8 or less, e.g., 6 or less. The minimum number of carbon atoms is 1 for the substituted or unsubstituted alkyl group and 6 for the substituted or unsubstituted aryl groups. The number of carbon atoms includes the carbon atoms in any substituent, if present.

Herein, and incidentally also in the following description of other formulae unless specified differently, a "substituted" group refers to the recited group that is substituted by one or more substituents, such as 1, 2 or 3 substituents. The type of the one or more optional substituents is not particularly limited and generally includes groups that are not crosslinkable groups, as will be described below. In certain embodiments the optional substituent can be selected from the group consisting of a halogen atom (F, Cl, Br and I), a nitro group, an amino group, a C1-6 alkylester group, an arylester group, such as a phenylester group, a C1-6 alkylether group, an arylether group, such as a phenylether group, a cyano group, and a C1-6 alkyl carbonyl group. Thus, in one embodiment, one or more of the R groups represents an alkyl group or an aryl group that is substituted by one or more substituents, such as a fluoroalkyl group or a fluoroaryl group. Herein, the number of fluorine atoms is not limited, but can be from 1 to 6. In one embodiment, R can represent a perfluoroalkyl group, e.g., perfluoromethyl, or a perfluoroaryl group.

In the above formula (1), the group represented by $(R_3SiO_{1/2})$ represents a terminal group of a siloxane chain, and the group $(R_2SiO)$ represents a divalent (linear) siloxane chain repeating unit. These groups are necessary to form a linear siloxane, so that n and m each are >0. For a linear polysiloxane, n is 2 and m is a number of 2 or more, such as 50 or more or 100 or more. Typically, n can take values of up to 10,000, such as 8,000 or less or 6,000 or less, but also 4,000 or less, 2,000 or less, or 1,500 or less, such as 1,000 or less or 800 or less.

The group represented by $(RSiO_{3/2})$ represents a group forming a branched structure, where a silicon atom is bound to three other silicon atoms via a Si—O—Si linkage. Such a group is no crosslinked structure in the sense of the present invention. Its presence is optional (i.e., o can be 0), but typically the amount of such groups is limited to 20 or less, such as 10 or less, e.g., 5 or less, relative to a total of n and m of 100.

The group represented by $(SiO_2)$ represents a silicon atom that is surrounded by four siloxane chains. Again, such a group is no crosslinked structure in the sense of the present invention. It is entirely optional, and the relative amount as is limited to 20 or less, such as 10 or less, e.g., 5 or less, relative to a total of n and m of 100.

The groups R are selected from the group consisting of substituted or unsubstituted alkyl groups (e.g., methyl, ethyl or propyl), substituted or unsubstituted aryl groups (e.g., benzyl), and substituted or unsubstituted polydiorganosiloxy groups, provided that at least two R groups are a group $R^a$ that includes a crosslinkable group. In the polydiorganosiloxy groups, the organic groups can be chosen from substituted or unsubstituted alkyl groups (e.g., methyl, ethyl or propyl), substituted or unsubstituted aryl groups (e.g., benzyl). Incidentally, the above definition of the substituted and unsubstituted alkyl groups and the substituted and unsubstituted aryl groups applies to the organic groups present in the polydiorganosiloxy groups, including the types and amount of optional substituents, so that, e.g., also fluoroalkyl groups and fluoroaryl groups are included.

The crosslinkable group included in Rd can be freely chosen from those known to a person skilled in the art, and an ethylenically unsaturated group is preferably used due to its high reactivity. Other examples of crosslinkable groups include an epoxy group, a hydroxy group, an isocyanate group, and similar. The ethylenically unsaturated group may be part of a (meth)acrylate group, and in this case the group $R^a$ is a (meth)acrylate group or includes a (meth)acrylate group. As long as the crosslinkable group is present, the nature of $R^a$ is not particularly limited. $R^a$ may thus be selected from the alkyl groups and aryl groups that are defined above for the substituted and unsubstituted alkyl group and substituted and unsubstituted aryl groups represented by R, except that at least one crosslinkable group is present. Examples of such group is thus an alkylene group that is substituted by a (meth)acrylate group, such as ethylene(meth)acrylate, which is one embodiment of formula (3) below. In addition to the crosslinkable group, further substituents may or may not be present, and these can be selected from the possible substituents listed above for the substituted and unsubstituted alkyl group and substituted and unsubstituted aryl groups represented by R.

In one embodiment, the crosslinkable silicon-based material is a linear crosslinkable silicone (a2) represented by formula (2):

$$R^1_3Si—O—(SiR^2_2—O)q—SiR^1_3 \qquad (2)$$

wherein q is an integer of 50 or greater, preferably 2000 to 6000, the groups $R^1$ and $R^2$ can be the same or different and each represent a substituted or unsubstituted alkyl groups or a substituted or unsubstituted aryl group as defined above, provided that at least two of the groups represented by $R^1$ and $R^2$ are a group $R^a$ containing a crosslinkable group, which is preferably an ethylenically unsaturated group. The groups $R^1$ and $R^2$ are preferably selected from substituted or unsubstituted alkyl groups having a total of 1 to 6 carbon atoms or a substituted or unsubstituted aryl group having a total of 6 to 12 carbon atoms. Preferred examples of $R^1$ and $R^2$, not including a group $R^a$ including a crosslinkable group, include methyl and ethyl. The various $R^1$ and $R^2$ may be respectively the same or different from each other. The group $R^a$ is not particular limited as long as it includes a crosslinkable groups, and an example thereof is a group including a terminal or intermittent ethylenically unsaturated group. Such materials are commercially available, e.g., as DOWSIL 7651 (Dow Corning).

In embodiments, the group $R^a$ that contains a crosslinkable group is represented by formula (3):

$$CH_2=CH(X)—C(O)O\text{-L} \qquad (3)$$

wherein X is hydrogen or a methyl group, and L is a divalent connecting group binding the group of formula (3) to the remainder of the compound of formula (1) or (2), respectively. Examples of L include a divalent alkylene group having 1 to 12 carbon atoms, preferably 2 to 8 carbon atoms. L can bind directly to the silicon atom via a carbon-silicon bond.

The above description of formulae (1), (2) and (3) has been given for a crosslinkable silicone-based material that is based on silicone only. In embodiments, the present disclosure however also contemplates the use of copolymers of a silicone. Examples of such copolymers include those wherein the silicone polymer of formula (1) or (2) forms a copolymer block X of a block copolymer containing one or more silicone polymer blocks represented by formula (1) and/or (2) and one or more copolymer blocks represented by Y. Such block copolymers may thus take the form of X—Y, X—Y—X, Y—X—Y, Y—X—Y—X, Y—X—Y—X—Y, X—Y—X—Y—Y, etc., wherein each X is a silicone polymer block represented by formula (1) and/or (2), and each Y is polymer block different from a silicone polymer blocks represented by formula (1) and/or (2). When there are multiple blocks of Y, these may be the same or different, respectively, and when there are multiple blocks of X, these may be the same or different, respectively.

Examples of polymer blocks Y include polymer blocks derived from alpha-olefins, such as polyethylene or polypropylene, blocks derived from unsaturated acids such as (meth)acrylates, polyurethane blocks, polyester blocks, polyether blocks, and polyurea blocks. In such a block copolymer, the amount of silicone blocks X is typically 25% by weight or more, such as 50% by weight or more, relative to the total weight of the block copolymer.

In the above block copolymer, the crosslinkable group is present in $R^a$ as part of the silicone copolymer block X. In another embodiment of the crosslinkable silicone-based material, however the above definition above the block copolymer applies, except that the group $R^a$ is present in the one or more polymer blocks Y. In this case, the one or more silicone-based polymer blocks X may not include a crosslinkable group $R^a$, and such a group is present in one or more of the polymer block(s) Y. In this case, the above definition of X in relation to formula (1) and (2) applies, except for the non-applicable requirement that at least one of the groups R is a group $R^a$. Yet, of course, it is also possible that one or more of the at least one polymer blocks X contains a group $R^a$, and that simultaneously one or more of the at least one polymer blocks Y contains a group $R^a$.

The crosslinkable silicone-based material, which may be represented by formula (1) or (2) as described above, preferably has a weight-average molecular weight of 30,000 or more and 2,000,000 or less, such as 32,000 or more, 35,000 or more or 40,000 or more, and preferably 1,500,000 or less, 1,000,000 or less, 750,000 or less, or 500,000 or less, e.g., 250,000 or less, 200,000 or less or 175,000 or less. This also applies to the block copolymer embodiments described above, where the molecular weight applies to the total of the block copolymer and not the individual polymer blocks.

The amount of the crosslinkable silicone-based material, which may be represented by formula (1) or (2) as described above, is typically 30% by weight or more, such as 35% by weight or more, 40% by weight or more, 45% by weight or more, 50% by weight or more, 55% by weight or more, 60% by weight or more, 65% by weight or more, 70% by weight or more, 75% by weight or more, 80% by weight or more, 85% by weight or more, or 90% by weight or more, but may also be 100% or less, e.g., 95% by weight or less, such as 92% by weight or less, relative to the total weight of the CC excluding any optional solvent. A preferred range is from 50 to 90% or from 60 to 80%.

In addition to the crosslinkable silicone-based material, the CC may preferably comprise a crosslinking compound (a3) comprising at least two groups having reactivity with the crosslinkable groups comprised in the at least two groups $R^a$ present in the compound (a1) and/or (a2) or block copolymers comprising these as copolymer blocks, wherein in case these crosslinkable groups present in $R^a$ are ethylenically unsaturated groups, e.g., of formula (3), the groups having reactivity with the crosslinkable group comprised in the group $R^a$ preferably may also be ethylenically unsaturated groups, and are more preferably silicon hydride (Si—H) groups. This allows performing a hydrosilylation crosslinking reaction between the Si—H groups and the ethylenically unsaturated groups using a suitable catalyst containing, e.g., Pt, such as a Karstedt catalyst as described for example by Lewis et al in Platinum Metals Rev., 1997, 41, (2), 66, which is incorporated herein by reference. The use of such a system (which preferably then also includes the presence of a inhibitor such as a Mvi Mvi compound) allows to fine-tune the crosslinking density by suitable control of the reaction conditions, as the reaction only proceeds by thermal initiation at temperatures of 90° C. or higher. The duration of heating thus allows an easy control of the degree of crosslinking, which then determines in particular the stickiness and elastic properties of the cured product present in the PSL.

Suitable catalysts are commercially available, e.g., Syl-Off 4000 (Dow Corning). The suitable amount of catalyst, polymerization inhibitor (if present), and heating conditions can then be determined by simple routine tests, thereby allowing a skilled person to obtain the desired balance of properties.

Besides containing at least two groups having reactivity with the crosslinkable groups present in $R^a$, the crosslinking compound is not particularly limited. It is preferably a compound having a molecular weight of 10,000 or less, such as 5,000 or less, e.g., 2,000 or less or 1,000 or less or even 500 or less, in order to provide for a sufficient crosslinking density and suitable properties. The crosslinking compound may be a polymeric compound based on a polyorganosiloxane (e.g., dimethylsiloxane) that has been modified to contain at least two Si—H groups, such as Syl-Off 7678 (Dow Corning). Thus, the crosslinking compound may preferably be a compound having a siloxane chain. It may however also be a compound not having a siloxane chain. The amount of the crosslinking compound is typically 30% by weight or less, such as 25% by weight or less or 20% by weight or less, or even 15% by weight or less or 10% by weight or less, relative to the total weight of the CC excluding any optional solvent, if present.

As briefly addressed above, the CC furthermore typically contains a compound capable of initiating a crosslinking reaction upon activation by a suitable stimulus, such as heat or irradiation with, e.g., electromagnetic waves, preferably in the UV range. This allows starting the crosslinking reaction after the CC has been provided on a support. The crosslinking can also be effected by electron beams.

The type of initiator compound is mainly determined by the type of crosslinking reaction and the type of crosslinkable groups present in the crosslinkable silicone-based material and the optional crosslinker, as well as by the desired type of initiation. Examples of initiators include UV initiators, photoacid generators such as sulfonium or iodonium salts, thermal radical and ionic initiators, such as peroxides and diazonium compounds, or other initiators as well known to a skilled person. The amount of initiator is typically 3% by weight or less, such as 1% by weight or less, relative to the total weight of the CC. The UV initiator can be selected from known UV initiators, such as benzyl dimethyl ketal (IRGACURE® 651), benzoin isobutyl ether (BIBE), benzophenone and associated derivatives, 2,2-diethoxyacetophenone, cyclohexyl phenyl ketone and such derivatives (IRGACURE® 184), etc., mono and di-acylphosphine oxide derivatives (IRGACURE® 819), and similar substances. The most preferred photoinitiators are BIBE, IRGACURE® 184, and IRGACURE® 651. Most preferred is BIBE. The concentration of UV initiator can range from 0.5 to 3 weight %, but is preferably from 1 weight % to 2 weight %, relative to the total weight of the crosslinkable composition excluding the optional solvent. The UV initiator can be one compound, but also a combination of UV initiators can be used, e.g., with sensitivity towards different wavelengths.

In addition to the crosslinkable silicone-based material as for example the material (a1) represented by formula (1) and/or the material (a2) represented by formula (2), and/or block copolymers comprising these, and the optional crosslinking agent (a3) and the optionally, yet typically included crosslinking initiator, the crosslinkable composition may further comprise a compound (a4) other than the crosslinkable silicone-based compound of, e.g., formula (1) or (2). The CC may optionally also include a solvent (a5).

The compound (a4) that may be additionally present is not particular limited. It may be present in an amount of 70% by weight or less, 50% by weight or less, 30% by weight or less, such as 20% by weight or less, 15% by weight or less, 12% by weight or less, 10% by weight or less, 8% by weight or less, 6% by weight or less, 5% by weight or less, 4% by weight or less, 3% by weight or less, or 2% by weight or less, relative to the total weight of the CC or the PSL, but may also be absent. The compound (a4) may be a compound that is not able to undergo a crosslinking reaction with the crosslinkable groups present in the crosslinkable siliconbased compound of, e.g., formula (1) or (2) and the groups having reactivity therewith present in the optional crosslinking compound (a3), but may also be a compound that is able to react in the crosslinking reaction in order to improve the integrity of the crosslinked structure/the PSL.

In one embodiment, this additional compound (a4) is a silicon-free polymeric compound selected from polyurethanes, polyamides, polymers derived from alpha-olefins, copolymers with, e.g., diener, (meth)acrylate homopolymers and copolymers, epoxy resins, polycarbonates, polyesters, polyethers, etc. In another embodiment, the optional additional compound (a4) may include silicone resins, and in this case the compound (a4) may include silicone resins such as MQ, MTQ, TQ MT and MDT resins, of which MQ resins are preferred. The weight-average molecular weight of the silicone resin is preferably from 500 to 30,000. The silicone resin may also include alkenyl groups in order to integrate it into the crosslinked structure. Suitable silicone resins are DC 2-7066 (Dow Corning); MQ Resin VSR6201 (Chenguang Fluoro & Silicone Elastomers Co., Ltd).; MQ-RESIN POWDER 803 TF (Wacker Silicones); SR 545 (Momentive Performance Materials) or Silmer VQ9XYL and Silmer Q9XYL (Siltec).

In one embodiment, the CC and the resulting PSL may be completely silicon-based, which means that there are no polymeric compounds present that do not comprise a siloxane chain. In this case, the optional compound (a4) may be absent, but may also be selected from conventional silicones not having any crosslinkable groups, such as polydimethylsiloxane.

The conventional silicones and/or the silicone resins may typically be present in an amount of 70% by weight or less, such as 50% by weight or less, 30% by weight or less, such as 20% by weight or less, relative to the total weight of the CC or the PSL. The conventional silicones and silicone resins mentioned above may of course also be present in case the CC or PSL is not completely silicon-based, in which case they may be present in addition or as an alternative to the other carbon-based embodiments of the compound (a4) described above.

Additionally or alternatively to the compound (a4), the CC may contain monomers that are able to form a polymer upon suitable initiation. These may for instance include monomers such as one or more (meth)acrylic monomers. Such one or more of (meth)acrylic monomers may improve stickiness and adhesion, and can generally be included in an amount of 30% by weight or less, such as 25% by weight or less or 20% by weight or less, relative to the total weight of the crosslinkable composition excluding the optional solvent. The lower limit is not particularly limited and may be 0, but typically 5% by weight or more, such as 10% by weight or more of (meth)acrylic monomer may be included. This of course also depends on the nature of the (meth) acrylic monomer.

In one embodiment, the (meth)acrylic monomers are selected from those whose homopolymer exhibits a glass transition temperature of 0° C. or lower, preferably $-20°$ C. or lower. In another embodiment, the one or more (meth) acrylic monomers include at least one di- or higher functional (meth)acrylate. Examples of trifunctional (meth)acrylates include trimethylol propane trimethacylate (TMPTMA) and trimethylol propane triacrylate (TMPTA).

In one embodiment, the one or more (meth)acrylic monomer include at least one that is selected from those represented by formula (A-3) and (A-4):

$$R^7—(OCR^8HCH_2)_{n'}—(OCH_2CR^8H)_{m'}-L'-OC(O)— \quad CX=CH_2 \quad (A-3)$$

$$H_2C=CX—C(O)O-L''-(OCR^8HCH_2)_{n''}— \quad (OCH_2CR^8H)_{m''}-L''-OC(O)—CX=CH_2 \quad (A-4)$$

wherein $R^7$ is hydrogen or a C1-6 alkyl group, X is H or $CH_3$, $R^8$ is H or $CH_3$, m' and m'' each independently is an integer from 0 to 100, such as 1 to 50 or 2 to 30, n' and n'' each independently is an integer from 0 to 100, such as 1 to 50 or 2 to 30, with the proviso that each of n'+m' and n''+m'' is independently from 2 to 100, and L' and L'' each independently is a single bond or a divalent linking group, preferably a single bond or a C1-6 alkylene group such as methylene or ethylene.

The monomers of formula (A-3) and (A-4) are (meth) acrylate esters or di(meth)acrylate esters of polyethylene glycol or polypropylene glycol, or mixed poly(ethylene) (propylene)glycol. In case of an ester of a mixed poly (ethylene)(propylene)glycol (i.e., the case that neither n' nor m', o neither n'' nor m'' is 0), the respective ethylene oxide and propylene oxide can be present in block form, or can be distributed randomly.

The presence of a (meth)acrylate of formula (A-3) or (A-4) may improve the flexibility of the PSL. The presence of a (meth)acrylate of formula (A-3) or (A-4) is also believed to improve the oxygen permeability of the photopolymer composition. The (meth)acrylate of formula (A-3) or (A-4) is preferably contained in an amount of 0.5 to 10.0% by weight, relative to the total weight of the crosslinkable composition except for the optional solvent, such as from 1 to 5% by weight.

In one embodiment, the one or more (meth)acrylic monomers include one or more (meth)acrylic monomer(s) represented by formula (A-1), one or more (meth)acrylic monomer(s) represented by formula (A-2), or one or more of each of the monomers of formula (A-1) and formula (A-2):

$$CH_2=CHX—C(O)OR^5 \quad (A-1)$$

wherein X is H or $CH_3$, and $R^5$ is H or a monovalent organic group having 1-18 carbon atoms;

$$CH_2=CHX'—C(O)OR^6OC(O)CHX=CH_2 \quad (A-2)$$

wherein X' is independently H or $CH_3$, and $R^6$ is a divalent organic group having 2 to 18 carbon atoms.

In formula (A-1), X is H or $CH_3$, preferably $CH_3$. $R^5$ is H or an organic group having 1-18 carbon atoms, preferably an aliphatic hydrocarbon group having 1-18 carbon atoms, and more preferably an aliphatic hydrocarbon group having 4 to 16 carbon atoms. The aliphatic hydrocarbon group can be a branched or straight alkyl group. Examples of monomers of formula (A-1) include methyl (meth)acrylate, butyl (meth) acrylate, hexyl (meth)acrylate, and lauryl (meth)acrylate.

In formula (A-2), X' is H or $CH_3$, preferably $CH_3$. $R^6$ is a divalent group having 2 to 18 carbon atoms, preferably a straight or branched alkylene group, more preferably having 3 to 12 carbon atoms. Examples include butylene glycol dimethacrylate (BGDMA) and diethylene glycol dimethacrylate.

In the above formulae (A-1) and (A-2), $R^5$ and $R^6$ are H or an organic group having the specified number of carbon atoms. Examples thereof include aliphatic groups, such as alkyl and alkylene groups, respectively. $R^5$ and $R^6$ may be unsubstituted or substituted. If substituted, they are preferably substituted with one or more, such as 1, 2 or 3, substituents selected from halogen (Cl, Br, I, preferably Cl or Br) hydroxy or isocyanato, preferably hydroxy or isocyanato. Examples of compounds of formulae (A-1) and (A-2) include hydroxypropyl (meth)acrylate, hydroxyethyl(meth) acrylate, hydroxybutyl(meth)acrylate, isocyanato ethyl (meth)acrylate, isocyanato propyl (meth)acrylate, diisocyanato ethyl(meth)acrylate, etc.

The total amount of the monomer of formula (A-1) and/or (A-2) is not particularly limited, but is preferably 3% by weight or more, such as 5% by weight or more or 7% by weight or more, and is preferably 25% by weight or less, such as 20% by weight or less, or 15% by weight or less, relative to the total weight of the crosslinkable composition, excluding the optional solvent.

The crosslinkable composition may optionally include a solvent (a5). Such a solvent is preferably absent, as the evaporation of the solvent reduces the volume of the layer formed from the crosslinkable composition and makes a proper thickness adjustment more difficult. Evaporation of the solvent may also lead to a porous structure, which is not desired. If present, its amount is typically 50% by weight or less, preferably 25% by weight or less, such as 15% or 10% by weight or less. The solvent can be chosen from known organic solvents, such as aprotic solvents to the extent they are able to dissolve the components. A preferred solvent is an aliphatic or aromatic hydrocarbon, such as toluene or hexane, or an ether, ester or ketone such as THF. The solvent preferably has a boiling point of 120° C. or less, 100° C. or less, or 75° C. or less at 105 Pa.

As described above, the CC contains at least the crosslinkable silicon-based material (or compound) which may conform to formula (1) or (2), and typically further contains the crosslinker (a3) and a suitable initiator, and optionally a solvent. The composition may consist of these components, but additional compounds (a4), such as, e.g., a silicone resin, may also be present.

A shrinking of the composition at the time of crosslinking can be avoided or reduced when the crosslinking does not occur via a condensation reaction of oxy-substituted silanes, such as alkoxy-substitutes silanes, that leads to the formation of siloxane chains (Si—O—Si) or crosslinks. For this reason, oxy-substituted groups, such as alkoxy groups, are not crosslinkable groups in the sense of the present disclosure. Instead, the present disclosure makes use of a crosslinking reaction that proceeds, e.g., by the reaction of ethylenically unsaturated compounds leading to the formation of C—C or Si—C bonds, as, e.g., in the above-described hydroxylation reaction wherein an ethylenically unsaturated group is reacted with a Si—H containing compound. It has been found by the inventors that when the crosslinkable groups are chosen such that no Si—O—Si linkages are formed, shrinkage of the layer during crosslinking can be avoided or reduced to, e.g., 5% or less or 3% or less (expressed as (volume after crosslinking-volume before crosslinking)/volume before crosslinking)), which provided greater accuracy of the thickness of the resulting crosslinked PSL. This is important, as thickness variations have an impact of the repeat pattern length of a printing plate carried by the APFAL, and an incorrect thickness can lead to an increased circumferential length of the radially outwards side of the printing cylinder on which the APFAL is mounted, thereby potentially causing offset of the print.

In another aspect, the present inventors have found that cyclic siloxanes can impair the properties of the resulting PSL, in particular with respect to stickiness and cohesion of the PSL, but potentially also in other aspects. Accordingly, the PSL is preferably produced taking into account of this phenomenon, by determining the amount of cyclic siloxanes in the starting products and, if necessary, using purified starting product. Hence, the total content of cyclic siloxanes is preferably 1000 ppm by weight or less, relative to the total weight of the permanently sticky layer, and the total content of cyclic siloxanes selected from d4, d5 and d6 siloxanes is preferably 500 ppm by weight or less, such as 300 ppm or less, relative to the total weight of the permanently sticky layer. In one embodiment, the individual content of each individual cyclic siloxane, e.g., d4, d5 and d6, respectively, is each less than 1,000 ppm, preferably 500 ppm or less, more preferably 300 ppm or less, such as 200 ppm or less.

Permanently Sticky Layer (PSL)

The PSL comprises a crosslinked silicone based material (A) that is obtained after crosslinkable composition described above, typically by initiation using heat or radiation. While the PSL may contain other components besides the crosslinked structure obtained by crosslinking the crosslinkable composition, such as a polymeric compound (B) that may derive from a component (a4) that does not participate in the crosslinking reaction, the crosslinked structure derived from the crosslinkable silicon-based material and optionally the crosslinking compound typically forms 60% by weight or more or 70% by weight or more, such as 80% by weight or more or 90% by weight or more or 95% by weight or more, of the PSL. The PSL may also consist of the crosslinked structure. After crosslinking, the PSL exhibits permanently sticky properties.

The PSL is formed by providing the crosslinkable composition on a substrate as will be explained below, and then initiating the crosslinking reaction. The formation may also include heating the crosslinkable composition and/or the crosslinked structure in order to evaporate any solvent and/or unreacted monomer, if desired.

The thickness of the PSL is not particularly limited as long as the object of the present invention is achieved, but is typically 1.00 mm or less, preferably 0.90 mm or less, 0.80 mm or less, 0.70 mm or less, 0.60 mm or less, 0.50 mm or less, or 0.45 mm or less. The lower limit is not particularly limited, but can be 0.05 mm or more, such as 0.10 mm or more, 0.15 mm or more, or 0.20 mm or more, such as 0.25 mm or more.

The PSL preferably does not contain microspheres.

Support

The support (or substrate) on which the crosslinkable composition is provided and on which the crosslinking reaction is performed is not particularly limited, but is generally a film of, e.g., PET, PVC, PE, PA or PP. The thickness of the support is not particularly limited and depends on the intended purpose and desired structural integrity, but is preferably 50 to 800 $\mu$m, such as 100 to 300 $\mu$m.

The support surface to receive the crosslinkable composition may be roughened or otherwise pre-treated, e.g., by plasma discharge or corona discharge, and/or may be treated with a primer, such as a silane coupling agent, to improve the bonding strength between the PSL and the support.

The support may be translucent. This allows manufacturing the APFAL by crosslinking using irradiation (typically UV), and in which irradiation from either one or both sides of the support having the crosslinkable composition on one side can be employed.

Illustrative Method for the Preparation of an Adhesive Printing Form Attachment Layer The method for the preparation of an adhesive printing form attachment layer according to the present invention generally comprises the steps of providing the crosslinkable composition on a support, and crosslinking the composition. This can generally be effected by applying heat or radiation, e.g., UV.

Printing Form Attachment Cylinder

The laminate structure of substrate layer (support) and PSL layer may be attached to a printing form attachment cylinder (flexographic printing cylinder), with the substrate (support) facing towards the cylinder or printing sleeve. The other surface of the laminate can then serve to fix the printing form (flexographic printing plate) during printing operation, so that the laminate of substrate layer (support) and PSL can serve as adhesive printing form attachment layer.

The method of the present invention also allows adjusting the circumference of the printing cylinder to the desired degree by adjusting the thickness of the support and the PSL accordingly. As the PSL is very smooth, there are also no bumps that are transposed to the printing form, so that print quality is improved.

Optionally, the APFAL can be attached to the printing cylinder via a cushioning layer, in order to adjust the circumference of the cylinder. Such a cushioning layer can, e.g., be made from polyurethane, such as a flexible or foamed polyurethane layer. The adhesive printing form attachment layer can then be attached to such a layer via an adhesive. The cushioning layer can also be attached to the cylinder by means of an adhesive, or can in a preferred aspect possess adhesive properties in itself, so that no additional adhesive is needed.

In practice, often several printing form attachment cylinders are provided that are used to print different parts or colors of an image. Of course the benefits of the present invention are also pronounced if several of such printing cylinders are used. The present invention thus also relates to a set of two or more printing cylinders, each comprising the adhesive printing form attachment layer of the present invention attached to a plate cylinder, optionally via a cushioning layer.

Method of Operating a Printing Machine

The present invention further provides a method of operating a printing machine the method comprising Providing an APFAL according to the disclosure on a printing cylinder, the PSL facing radially outwards;

Attaching a printing form to the PSL of the APFAL;

Conducting printing using the printing form attached to the printing form attachment layer;

Replacing the used printing form by a new printing form and conducting printing with the new printing form, once or several times;

Cleaning the permanently sticky layer using a solvent; and

Attaching a printing form to the printing cylinder via the cleaned permanently sticky layer, and conducting printing.

The method of the present invention utilizes the permanently sticky properties of the PSL such that a printing form can be securely held during a printing operation. The use of double-sided adhesive tape is not necessary, and several printing forms can be attached, used for printing and then detached again. Cleaning using a solvent, such as organic solvent, e.g., based ethyl acetate or acetone, to remove dirt from the printing operation is then able to restore the permanently sticky properties of the PSL, making the APFAL ready for further use.

What is claimed is:

1. An adhesive printing form attachment layer comprising:

a support;

a permanently sticky layer disposed on the support, the permanently sticky layer comprising a crosslinked silicone-based material; and a cushioning layer provided on the support opposite the permanently sticky layer, wherein, the support is a film with a thickness within a range of from 50 μm to 800 μm.

2. The adhesive printing form attachment layer of claim 1, wherein the permanently sticky layer further comprises a polymeric material in addition to the crosslinked silicone-based material; and the polymeric material is selected from the group consisting of: a (meth)acrylate polymer or copolymer, a polyurethane, an alpha-olefin or copolymer thereof, a homopolymer or copolymer of a diene, an epoxy resin, a polyamide, a polycarbonate, a polyester, a polyether, and a silicone resin.

3. The adhesive printing form attachment layer of claim 2, wherein the polymeric material is selected from the group consisting of: a (meth)acrylate polymer or copolymer, a polyurethane, an alpha-olefin or copolymer thereof, a homopolymer or copolymer of a diene, an epoxy resin, a polyamide, a polycarbonate, a polyester, and a polyether.

4. The adhesive printing form attachment layer of claim 1, wherein, the permanently sticky layer comprises 1000 ppm by weight or less of cyclic siloxanes, relative to a total weight of the permanently sticky layer.

5. The adhesive printing form attachment layer of claim 1, wherein the film of the support is a polymer film;

the polymer film comprises one or more of polyethylene terephthalate, polyvinyl chloride, polyethylene, polyamide, and polypropylene; and the polymer film can transmit electromagnetic radiation having a wavelength within a range of 250 to 700 nm.

6. The adhesive printing form attachment layer of claim 1, wherein, the adhesive printing form attachment layer is disposed between a flexographic printing cylinder and a flexographic printing plate, with the flexographic printing plate adhered to the permanently sticky layer of the adhesive printing form attachment layer, and with the support oriented towards the flexographic printing cylinder.

7. The adhesive printing form attachment layer of claim 1, wherein the crosslinked silicone-based material is at least 60% by weight of the permanently sticky layer; and the permanently sticky layer has a thickness of 0.05 mm to 1.00 mm.

8. The adhesive printing form attachment layer of claim 1, wherein the crosslinked silicone-based material is a product of crosslinking a crosslinkable composition comprising a crosslinkable silicone-based material; and the crosslinkable silicone-based material comprises a compound represented by formula (1):

$$(R_3SiO_{1/2})_n(R_2SiO)_m(RSiO_{3/2})_o(SiO_2)_p \quad (1)$$

wherein the R groups are the same or different in each instance, provided that at least two R groups are a group $R^a$ that comprises a crosslinkable group and any remaining R groups are selected from the group consisting of: substituted or unsubstituted alkyl groups, substituted or unsubstituted aryl groups, and substituted or unsubstituted polydiorganosiloxy groups; and wherein, n and m each are >0, o and p each are ≥0.

9. The adhesive printing form attachment layer of claim 8, wherein the crosslinkable group of the group $R^a$ is an ethylenically unsaturated group.

10. The adhesive printing form attachment layer of claim 8, wherein, the crosslinkable group of the group $R^a$ is represented by formula (3):

$$CH_2=CH(X)-C(O)O-L \quad (3)$$

wherein X is hydrogen or a methyl group, and L is a divalent connecting group binding the group represented by formula (3) to the compound represented by formula (1).

11. The adhesive printing form attachment layer of claim 1, wherein the crosslinked silicone-based material is a product of crosslinking a crosslinkable composition comprising a crosslinkable silicone-based material; and the crosslinkable silicone-based material comprises a linear crosslinkable silicone represented by formula (2):

$$R^1_3Si-O-(SiR^2_2-O)_q-SiR^1_3 \quad (2)$$

wherein q is an integer of 50 or greater, the groups $R^1$ and $R^2$ can be the same or different and each represent a substituted or unsubstituted alkyl group or a substituted or unsubstituted aryl group, provided that at least two of the groups represented by $R^1$ and $R^2$ are a group $R^a$ containing a crosslinkable group.

12. The adhesive printing form attachment layer of claim 1, wherein, the crosslinked silicone-based material is a product of crosslinking a crosslinkable composition comprising a crosslinkable silicone-based material.

13. The adhesive printing form attachment layer of claim 12, wherein the crosslinkable composition further comprises a polymeric material selected from the group consisting of: a (meth)acrylate polymer or copolymer, a polyurethane, an alpha-olefin or copolymer thereof, a homopolymer or copolymer of a diene, an epoxy resin, a polyamide, a polycarbonate, a polyester, a polyether, and a silicone resin.

14. The adhesive printing form attachment layer of claim 12, wherein the crosslinkable composition further comprises one or more (meth) acrylic monomers; and the one or more (meth)acrylic monomers is 5% by weight to 30% by weight of the crosslinkable composition.

15. The adhesive printing form attachment layer of claim 12, wherein the crosslinkable silicone-based material has a weight-average molecular weight of 30,000 to 2,000,000; and the crosslinkable silicone-based material is 30% by weight to 100% by weight of the crosslinkable composition, excluding any solvent.

16. The adhesive printing form attachment layer of claim 12, wherein the crosslinkable composition further comprises one or more of trimethylol propane trimethacrylate (TMPTMA) and trimethylol propane triacrylate (TMPTA).

17. The adhesive printing form attachment layer of claim 12, wherein the crosslinkable composition further comprises one or more of butylene glycol dimethacrylate (BGDMA), diethylene glycol dimethacrylate, hydroxypropyl (meth)acrylate, hydroxyethyl(meth)acrylate, and hydroxybutyl(meth)acrylate.

18. The adhesive printing form attachment layer of claim 1, wherein the support is a film with a thickness within a range of from 100 $\mu$m to 300 $\mu$m.

19. The adhesive printing form attachment layer of claim 1, wherein the support is translucent.

20. The adhesive printing form attachment layer of claim 1, wherein wherein, the permanently sticky layer is completely silicon-based containing no polymeric compounds that do not comprise a siloxane chain, and wherein, the permanently sticky layer further comprises a silicone polymer that does not include any crosslinkable groups.

21. The adhesive printing form attachment layer of claim 1, wherein the cushioning layer comprises foamed polyurethane.

22. An adhesive printing form attachment layer comprising:

a support;

a permanently sticky layer disposed on the support, the permanently sticky layer comprising a crosslinked silicone-based material; and a cushioning layer provided on the support opposite the permanently sticky layer, wherein, the support is a film with a thickness within a range of from 50 $\mu$m to 800 $\mu$m, wherein, the crosslinked silicone-based material is a product of crosslinking a crosslinkable composition comprising a crosslinkable silicone-based material, and wherein, the crosslinkable composition further comprises (i) a crosslinking compound comprising silicon hydride (Si—H) groups and (ii) a catalyst containing Pt.

23. An adhesive printing form attachment layer comprising:

a support;

a permanently sticky layer disposed on the support, the permanently sticky layer comprising a crosslinked silicone-based material; and a cushioning layer provided on the support opposite the permanently sticky layer, wherein, the support is a film with a thickness within a range of from 50 $\mu$m to 800 $\mu$m, wherein, the crosslinked silicone-based material is a product of crosslinking a crosslinkable composition comprising a crosslinkable silicone-based material, and wherein, the crosslinkable composition further comprises one or more of isocyanato ethyl (meth)acrylate, isocyanato propyl (meth)acrylate, and diisocyanato ethyl (meth)acrylate.

\* \* \* \* \*